(12) United States Patent
Lee (10) Patent No.: US 6,959,000 B1
(45) Date of Patent: Oct. 25, 2005

(54) CONFIGURATION MANAGEMENT OF A HYBRID DCS-SONET RING NETWORK

(75) Inventor: Ted Chongpi Lee, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/500,387

(22) Filed: Feb. 8, 2000

(51) Int. Cl.[7] .............................................. H04L 12/28
(52) U.S. Cl. ....................... 370/404; 370/258; 370/907
(58) Field of Search .............................. 370/254, 255, 370/257, 258, 498, 535, 536, 537, 538, 539, 370/540, 541, 907, 404, 401

(56) References Cited

U.S. PATENT DOCUMENTS

| | | | | |
|---|---|---|---|---|
| 5,179,548 A | | 1/1993 | Sandesara ................... 370/16.1 |
| 5,189,410 A | | 2/1993 | Kosugi et al. .......... 340/825.14 |
| 5,218,604 A | | 6/1993 | Sosnosky .................. 370/85.14 |
| 5,327,427 A | | 7/1994 | Sandesara ................ 370/85.14 |
| 5,390,164 A | * | 2/1995 | Kremer ....................... 370/223 |
| 5,623,482 A | | 4/1997 | Okanoue ..................... 370/224 |
| 5,742,605 A | * | 4/1998 | Norman, Jr. ................. 370/405 |
| 5,799,001 A | * | 8/1998 | Lee et al. ..................... 370/220 |
| 6,195,367 B1 | * | 2/2001 | Jakobik et al. .............. 370/535 |
| 6,205,121 B1 | * | 3/2001 | Heuer ......................... 370/250 |
| 6,205,154 B1 | * | 3/2001 | Schmidt et al. ............. 370/458 |
| 6,389,015 B1 | * | 5/2002 | Huang et al. ................ 370/376 |
| 6,594,236 B1 | * | 7/2003 | Lee ............................. 370/242 |

* cited by examiner

*Primary Examiner*—Duc Ho (57) ABSTRACT

A method and apparatus for adapting a network topology including at least one hybrid digital cross-connect system (DCS)/SONET ring structure such that DCS network elements are managed by a DCS element management system, while SONET network elements such as ring structures are managed by a SONET element management system. A digital link is created to separate pure DCS equipment from SONET equipment within the hybrid DCS. Based on this separation, the hybrid DCS is logically decomposed into separate DCS and SONET equipment such that a SONET ring structure including an add-drop multiplexer (ADM) included within the DCS may be managed as a homogeneous SONET ring by a SONET network element manager, while the DCS equipment is managed by a DCS element manager.

17 Claims, 4 Drawing Sheets

CONFIGURATION MANAGEMENT OF A HYBRID DCS-SONET RING NETWORK

TECHNICAL FIELD

The invention relates to the field of communications systems and, more specifically, the management of a communications network including digital cross-connect system (DCS) network elements and add-drop multiplexer (ADM) network elements adapted to form hybrid DCS/SONET ring structures.

BACKGROUND OF THE INVENTION

A hybrid digital cross-connect system (DCS) comprises a plurality of input/output DCS ports and at least one synchronous optical network (SONET) add-drop multiplexer (ADM). A hybrid DCS/SONET ring comprises, for example, a plurality of ADMs arranged in a ring topology where at least one of the plurality of ADMs is physically included within a DCS. Such a hybrid DCS/SONET ring structure provides cost savings and other benefits known to those skilled in the art. However, the use of such an arrangement introduces complexities and inefficiencies into the process of managing the various DCS and SONET network elements.

Normally, a DCS element management system (EMS) is used to manage DCS network elements, while a SONET EMS is used to manage add-drop multiplex (ADM) rings. The DCS-EMS and SONET-EMS are in turn managed by a network management system (NMS).

In the case of a hybrid DCS/SONET or non-homogeneous ring network, the SONET network elements forming the SONET ring are decomposed into one or more arcs (or a plurality of individual SONET network elements) for management purposes. Unfortunately, such decomposition at the SONET-EMS layer makes it necessary to re-compose the network elements or arcs into a ring at the NMS layer so that the NMS may perform appropriate configuration management (CM) tasks and other tasks.

SUMMARY OF THE INVENTION

The invention comprises a method and apparatus for adapting a network topology including at least one hybrid DCS/SONET ring structure such that DCS network elements are managed by a DCS element management system, while SONET network elements such as ring structures are managed by a SONET element management system.

In one embodiment of the invention, a hybrid DCS/SONET ring includes an ADM that is physically incorporated within the DCS yet logically incorporated within the SONET ring. A digital link is created to separate the pure DCS equipment from the ADM equipment within the DCS. Based on this separation, a hybrid DCS is logically decomposed to a DCS logical network element and at least one ADM logical network element. Thus, the ADM within the DCS, and the other ADMs forming the SONET ring structure, are managed as a ring structure rather than as a plurality of arc structures. The invention allows the respective DCS and SONET element management systems to manage the DCS/SONET hybrid ring structure(s) in a manner that avoids logically decomposing the SONET network elements of the hybrid ring structure into one or more SONET arcs.

Specifically, in a communications system utilizing a digital cross-connect system (DCS) element management system for managing DCS network elements and an add-drop multiplexer (ADM) element management system for managing SONET ADM network elements, an apparatus according to the invention comprises a homogeneous SONET ring network including a plurality of ADMs, the SONET ring network being managed by the ADM element management system; a plurality of DCS elements, each of the plurality of DCS elements being managed by the DCS element management system, at least one of the plurality of DCS elements including an ADM that is logically coupled to the SONET network and managed by the ADM element management system.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The subject invention will be described within the context of a communications system comprising a plurality of network elements arranged in various configurations such as ring networks. Specifically, the subject invention will be described within the context of a communications system including at least one hybrid ring structure comprising a digital cross-connect system (DCS) having associated with it at least one SONET ring, where the SONET ring comprises a plurality of add-drop multiplexer (ADM) network elements. The invention allows respective DCS and SONET element management systems to manage the hybrid ring structure in a manner that avoids logically decomposing the SONET network elements of the hybrid ring structure into one or more SONET arcs.

Figure 1:
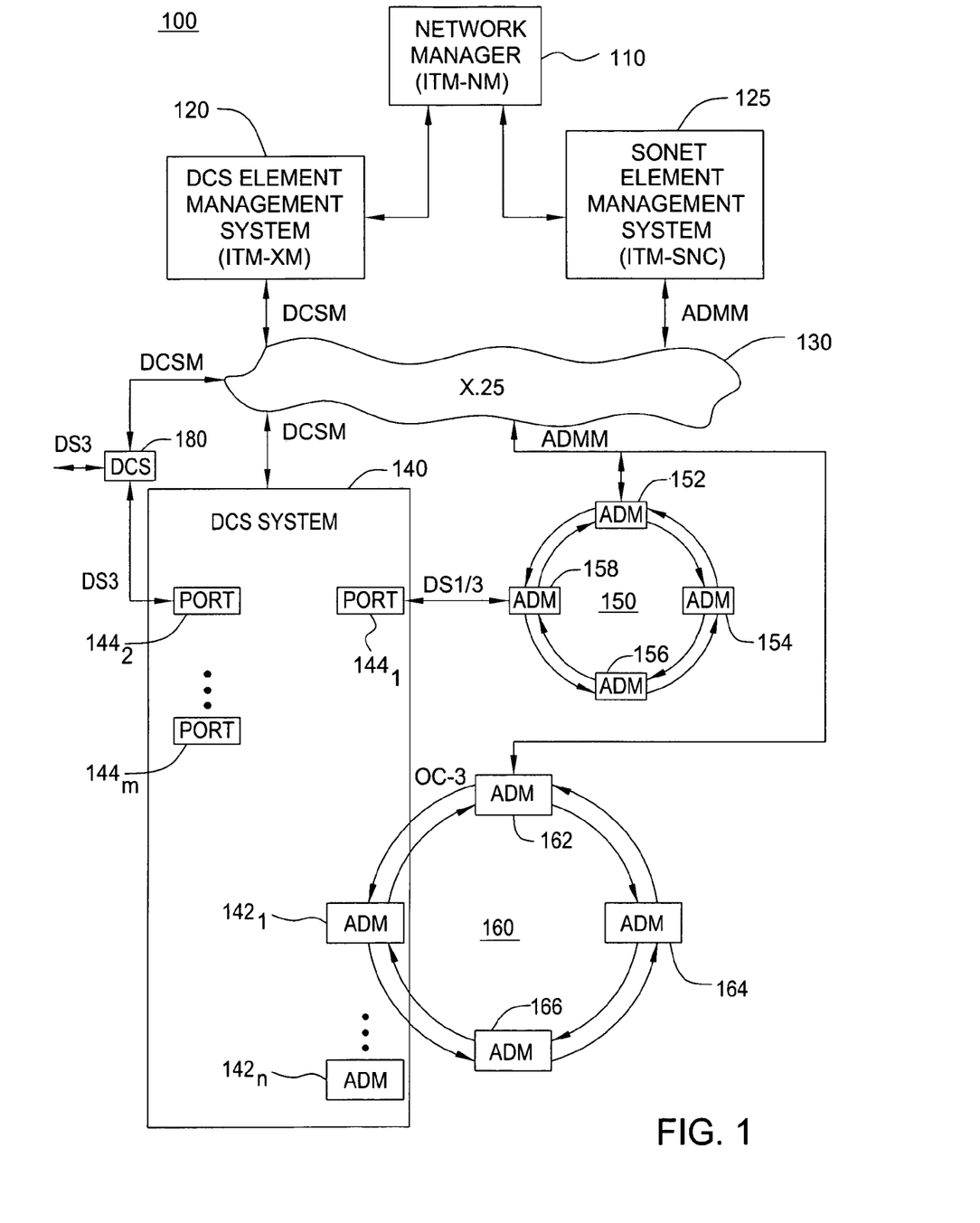
FIG. 1 depicts a high level block diagram of a communications system including the present invention.

FIG. 1 depicts a high level block diagram of a communications system including the present invention. Specifically, the communications system 100 of FIG. 1 comprises a network manager 110, a DCS element management system 120, a SONET element management system 125, a data communications network (DCN) 130, a first DCS 140, a first homogeneous SONET ring 150, a second non-homogeneous or hybrid SONET ring 160, and a second DCS 180.

The network manager 110 comprises, illustratively, an Integrated Transport Management Network Manager (ITM-NM) manufactured by Lucent Technologies, Inc. of Murray Hill, N.J. The network manager 110 implements network management layer functions according to, for example, the telecommunications management network (TMN) standards described in the International Telecommunications Union (ITU) recommendation M.3010 and related documents, which are incorporated herein by reference in their entirety. Thus, the network manager 110 is used to manage all network elements within the communication system 100 of FIG. 1, both individually and as a set of network elements. The network manager 110 is operatively coupled to the DCS element management system 120 and the SONET element management system 125.

The DCS element management system 125 comprises, illustratively, a Integrated Transport Management Cross-Connect Module (ITM-XM) manufactured by Lucent Technologies, Inc. The DCS element management system 120 manages each DCS (e.g., 140 and 180) within the communication system 100 of FIG. 1. The DCS element management system 120 implements the element management layer of the TMN standard as it applies to DCS network elements. The DCS element management system 120 is coupled to each of the DCS network elements 140 and 180 to be managed via the DCN 130, illustratively a public switched packet data network (PSPDN) utilizing the X.25 layered packet transmissions protocol. The communications path between the DCS element management system 120 and the managed DCS network elements is denoted as DCSM.

The SONET element management system 125 comprises, illustratively an Integrated Transport Management SONET Network Controller (ITM-SNC) manufactured by Lucent Technologies, Inc. The SONET element management system 125 manages all independent SONET network elements, such as add-drop multiplexers (ADMs) within the network 100 of FIG. 1. The SONET element management system 125 implements the element management layer of the TMN standard as it applies to SONET network elements. The SONET element management system 125 is coupled to each of the SONET network elements to be managed via the DCN 130. The communications path between the SONET element management system 125 and the managed SONET network elements is denoted as ADMM. Specifically one ADM within each of the SONET rings 150 and 160 operates as a gateway network element (GNE) that is coupled to the SONET element management system 125 via the DCN 130. Furthermore, the SONET embedded data communications channel (DCC) is used for the SONET ADM communications within a ring. In this manner, each of the network elements within the SONET ring is managed by the SONET element management system 125 in substantially a standard manner.

The data communications network (DCN) 130 comprises, illustratively, a public switched packet data network (PSPDN) utilizing the X.25 layered packet transmissions protocol. However, it will be appreciated by those skilled in the art that the DCN 130 may be implemented using any network control channel or protocol suitable for providing such network management communication between network elements.

The network manager 110 implements the network management layer of the TMN standard, while the DCS element management system 120 and SONET element management system 125 implement the element management layer of the TMN standard. The DCS network elements 140 and 180 and the SONET network elements 150 and 160 form the network element layer of the TMN standard hierarchy. It should be noted that the network management layer implemented by the network manager 110 may also interact with a service management layer (not shown) within the TMN functional layer hierarchy.

Each DCS 140 and 180 is capable of accessing the lower data rate channels within a high data rate multiplex signal and coupling the low data rate channels to different network elements via different DCS output ports. For example, the low data rate channels may comprise DS-1, DS-3 or STS-1 signals multiplexed within a high data rate channel comprising an OC-3 or OC-12 signal. In the exemplary embodiment of FIG. 1, each DCS communicates using DS-1, DS-3 or OC-3 signals.

In the exemplary embodiment of FIG. 1, the first DCS 140 includes a plurality of ADMs denoted as $142_1$, $142_2$, $142_3$ and so on up to $142_n$ (collectively ADMs 142). The first DCS 140 also includes a plurality of input/output ports denoted as $144_1$, $144_2$ and so on up to $144_m$ (collectively ports 144). The DCS system 140 is capable of connecting signals between the various ports 144 and/or ADMs 142. By incorporating ADMs within the DCS, a cost savings is realized since an ADM is necessary to connect to a SONET ring. Thus, the DCS 140 may communicate directly with SONET network elements such as ADMs formed into SONET ring structures.

In one embodiment of the invention, the DCS 140 comprises a TITAN® 5500 digital cross-connect system, manufactured by Tellabs Inc. of Lisle, Ill. The TITAN® 5500 digital cross-connect system, as well as similar systems from other vendors, provides both DCS and ADM functionality within the same physical enclosure. However, DCS network elements and ADM or other SONET network elements must still be managed by appropriate element management systems. The second DCS 180 is coupled to the first DCS 140 via, illustratively, a digital signal level 3 (DS-3) signal path.

Each of the SONET rings 150 AND 160 is depicted as comprising four add-drop multiplexers (ADMs). However, it will be appreciated by those skilled in the art that SONET rings of any number of ADMs may be employed within the context of the invention. Moreover, it is not necessary for the practice of the invention that SONET ring structures be used (though the invention is particularly attractive in such networks). Rather, the invention is applicable to any grouping of SONET network elements where logical or physical separation of such SONET network elements from DCS network elements may be employed to simplify network management.

Each of the SONET rings 150 and 160 will be described as unidirectional path-switched rings (UPSR). However, it will be appreciated by those skilled in the art that other network structures may be implemented, such as bidirectional path-switched ring (BPSR), unidirectional line-switched ring (ULSR) and bidirectional line-switched ring (BLSR) topologies. Additionally, it should be noted that while the SONET rings 150 and 160 are described as having the same ring structure (i.e., UPSR), the rings may comprise several different ring or point-to-point network structures.

The first or homogeneous (i.e., non-hybrid) SONET ring 150 comprises four ADM network elements denoted as ADMs 152, 154, 156 and 158. The exemplary first SONET ring 150 comprises a unidirectional path-switched ring (UPSR), illustratively a Lucent Technologies DDM-2000 OC-3 Ring Network. The first ADM 152 serves as a gateway network element (GNE) and is coupled to the SONET element management system 125 via the management control path ADMM. The fourth ADM 158 is coupled to the first port $144_1$ of the DCS system 140.

The second or non-homogeneous (i.e., hybrid) SONET rings 160 comprises four ADMs denoted as 162, 164, 166 and the first ADM $142_1$, of the DCS system 140. The exemplary second SONET ring 160 also comprises a UPSR. The ADM 162 of the second ring network 160 serves as a GNE and is coupled to the SONET element management system 125 via the management control signal ADMM.

The first SONET ring 150 comprises a homogeneous SONET ring coupled to the first port $144_1$ of the DCS 140. The first SONET ring 150 is managed as a ring structure, rather than as a plurality of arcs, by the SONET EMS 125. The first port $144_1$ of the DCS 140 is managed by the DCS EMS 120.

The second or non-homogeneous SONET ring 160 comprises a hybrid SONET ring. That is, the non-homogeneous SONET ring 160 includes a network element (i.e., ADM $142_1$) within the DCS system 140. As previously discussed, the first ADM $142_1$ may be logically decomposed and managed by the DCS EMS 120 as a sub-element of the DCS 140. However, doing so results in the remaining three ADMs 162, 164 and 166 of the second SONET ring 160 being managed by the SONET EMS 125 as an arc, rather than as a ring. Therefore, according to the present invention, to avoid managing the second SONET ring 160 as an arc, the ADM $142_2$ is logically coupled to the other three ADMs 162, 164, 166 forming the second ring such that the SONET EMS 125 is used to manage each of the ADMs (162, 164, 166 and $142_1$) forming the second ring 160. That is, the SONET EMS 125 views the four ADMs 162, 164, 166 and $142_1$ as logically comprising a homogeneous (i.e., non-hybrid) SONET ring for management purposes. In this case, network management information is transferred between the SONET element management system 125 and the ADM $142_1$ within the DCS 140 via the gateway network element of the second SONET ring 160 (i.e., ADM 162).

The DCS 140 is characterized, for management purposes, as a DCS network element that is coupled to a SONET network element via a digital link. That is, the DCS switching equipment within the hybrid DCS 140 is characterized as a DCS network element while the SONET equipment (e.g., ADM $142_1$) within the hybrid DCS 140 is characterized as a SONET ring structure. Communication between the ADM $142_1$ and the appropriate DCS equipment within the DCS 140 is achieved via a digital link, illustratively an ST-3 signal.

Figure 2:
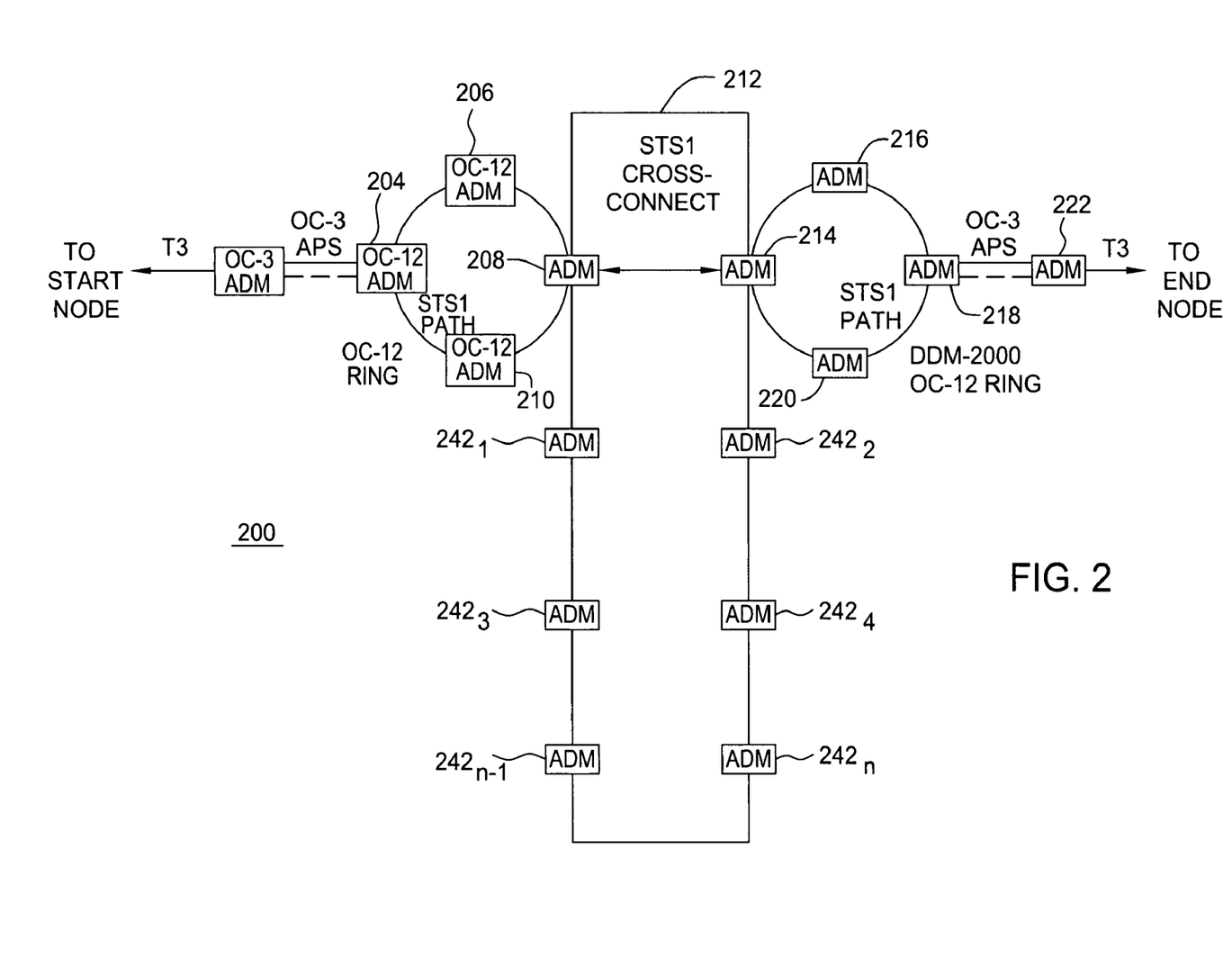
FIG. 2 depicts a high level block diagram of a network structure including the present invention.

FIG. 2 depicts a high level block diagram of a network structure including the present invention. Specifically, FIG. 2 depicts a network structure 200 comprising a pair of OC-12 rings coupled together via a digital cross-connect system (DCS) and routing a communication, illustratively a T3 signal, between a start-node (A-node) and an end-node (Z-node) (not shown).

A T3 communication signal is propagated from a start-node or network element (not shown) to a port of a first add-drop multiplexer (ADM) 202. The first ADM 202 is coupled to a second ADM 204 via an APS (automatic protection switching channel) providing an OS-3 signal path. The second ADM 204 is part of a first SONET OC-12 ring network including three more ADMs, denoted as 206, 208 and 210, where ADM 208 is included within a DCS 212. A second OC-12 ring network is formed by four ADMs, denoted as 214, 216, 218 and 220, where ADM 214 is included within the DCS 212. ADM 218 is coupled to an ADM 222 via an OC-3 APS path.

Each of the ADMs within FIG. 2 are managed by a SONET EMS (not shown) via a connection between an ADM in each ring operating as a GNE. Similarly, the DCS 212 is managed by a DCS EMS (not shown).

In the exemplary embodiment of FIG. 2, the two ADMs 208 and 214 depicted as being included within the DCS 212 are logically coupled to their respective OC-12 rings. That is, for management purposes, ADM 208 is logically part of the first OC-12 ring and ADM 214 is logically part of the second OC-12 ring.

In the exemplary embodiment of FIG. 2, an additional plurality of ADMs denoted as $242_1$, $242_2$ and so on up to 242 (collectively ADMs 242) are depicted as being included within the DCS 212. Thus, the DCS 212 may be used to supply one ADM to each of, illustratively, n SONET ring networks thereby forming up to n DCS integrated SONET ring networks. By logically partitioning each of the ADMs included within the DCS 212, the network management associated with such a complex grouping of DCS integrated SONET ring networks is greatly reduced.

The embodiments of the invention described above with respect to FIG. 1 and FIG. 2 provide network structures that enable a network manager (e.g., network manager 110 in FIG. 1) to create a digital link between a DCS network element and a UPSR ring formed using a SONET network element physically incorporated within the DCS network element. As such, the hybrid DCS may be managed at the network management layer similar to a homogeneous DCS and ADM ring network. For example, in one embodiment of the invention, a TITAN® 5500 DCS supporting a plurality of integrated UPSR-type rings provides digital links which link two logical NEs that can be channelized to DS-1/3, STS-1/VT-1.5 paths.

Figure 3:
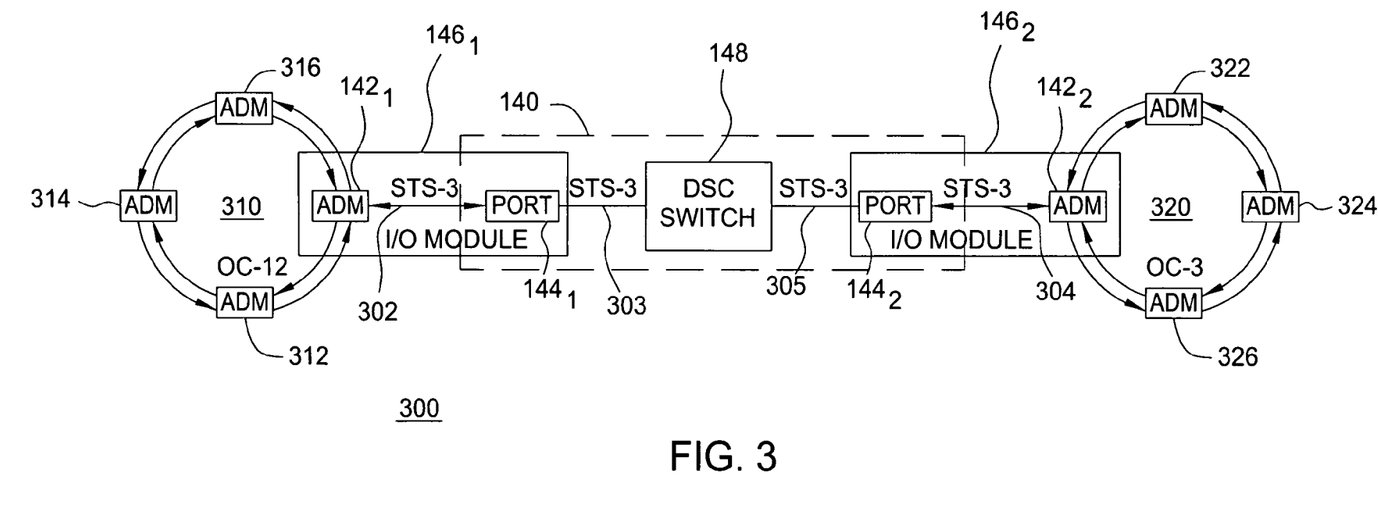
FIG. 3 depicts a high level block diagram of a network structure including the present invention.

FIG. 3 depicts a high level block diagram of a network structure including the present invention. Specifically, FIG. 3 depicts a network structure 300 comprising an OC-12 ring 310 coupled to an OC-3 ring 320 via respective input/output modules 146 of digital cross-connect system (DCS) 140. The OC-12 ring 310 and OC-3 ring 320 comprise hybrid DCS/SONET ring structures.

The DCS 140 comprises a switching circuit 148 coupled to each of a plurality of input/output (I/O) modules $146_1$ through $146_m$ (collectively I/O modules 146), where m is an integer. The network structure 300 depicted in FIG. 3 utilizes two of the I/O modules 146. Each I/O module 146 is coupled to the switching circuitry 148 within the DCS 140 via, illustratively, a respective STS-3 digital link. Each I/O module 146 comprises a DCS port 144 and an ADM 142 coupled together via, illustratively, an STS-3 digital link.

The first SONET ring 310 is formed using an ADM $142_1$ within a first I/O module $146_1$ and three additional ADMs, denoted as 312, 314 and 316. The second SONET ring 320 is formed using an ADM $142_2$ within a second I/O module $146_2$, and three additional ADMs denoted as 322, 324 and 326.

It is important to note that each of the DCS I/O modules $146_1$ and $146_2$, along with the DCS switching circuit 148, are physically included within a single hybrid DCS 140. However, according to the principles of the present invention, the ADM $142_1$ is separated from the DCS 140 by a digital link (DL) 302, illustratively an STS-3 data link. Similarly, the ADM $142_2$ is separated from the DCS 140 by a digital link 304, illustratively an STS-3 data link.

The DCS 140 is characterized, for management purposes, as a DCS network element that is coupled to a SONET network element via a digital link. That is, the DCS switching equipment 148 and DCS ports 144 within the hybrid DCS 140 are characterized as a DCS network element while the SONET ADMs 142 within the hybrid DCS 140 are characterized as SONET network elements.

The DCS network elements 144 and 148 are managed by the DCS-EMS 120. Similarly, the ADMs forming the hybrid ring networks 310 and 320 are managed by the SONET EMS 125.

By decoupling the ADM $142_1$ from the DCS 140 and characterizing the communication path between the ADM $142_1$ and the DCS 140 as an STS-3 digital link, the above-described separation of the ADM $142_1$ is achieved, thereby allowing standard network management layer operations to be performed.

Figure 4:
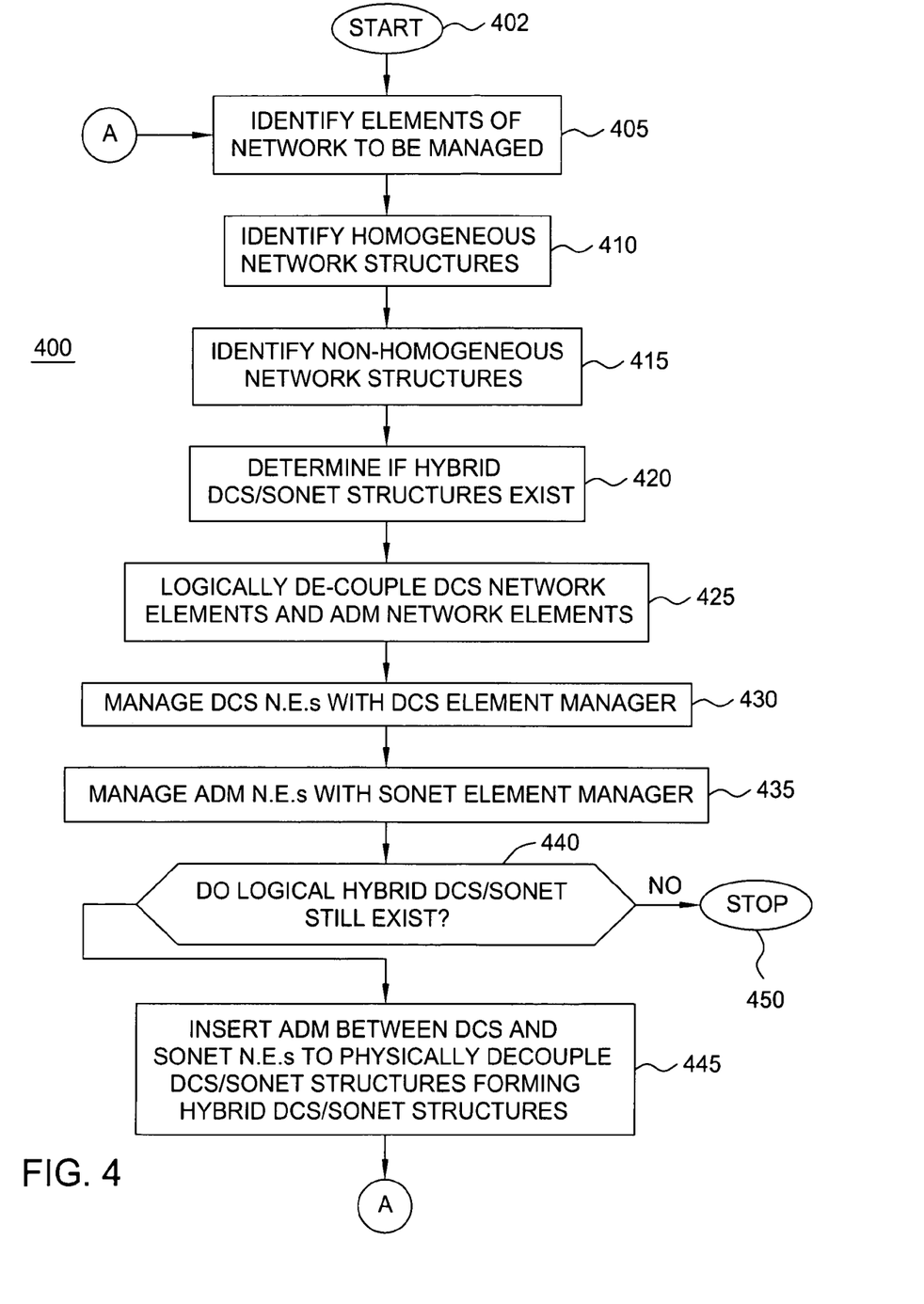
FIG. 4 depicts a flow diagram of a method according to the invention.

FIG. 4 depicts a flow diagram of a method according to the invention. Specifically, FIG. 4 depicts a flow diagram of a method 400 for adapting a communications network in a manner tending to reduce the above-described network element management problems.

The method 400 of FIG. 4 is entered at step 402 and proceeds to step 405, where the elements of a network to be managed are identified. That is, at step 405 each network element to be managed within a network to be managed is identified. The method 400 then proceeds to step 410.

At step 410, homogeneous network structures within the network are identified. That is, at step 410 homogeneous network structures such as "pure" SONET rings (e.g., SONET ring 150) and other homogeneous network structures are identified. The method 400 then proceeds to step 415.

At step 415 non-homogeneous network structures within the network to be managed are identified. That is, at step 415 the non-homogeneous network structures such as hybrid DCS/SONET ring 160 are identified. The method 400 then proceeds to step 420.

At step 420, a determination is made as to whether non-homogeneous network structures exist. That is, at step 420 a determination is made as to whether, for example, SONET ring networks having associated DCS components are configured such that they form hybrid networks. The method 400 then proceeds to step 425.

At step 425, the DCS network elements and ADM network elements of any hybrid DCS/SONET network structures are decoupled. That is, in the case of a hybrid network structure comprising a DCS including one (or more) of a plurality of ADMs forming a SONET network, the ADM associated with the DCS is decoupled from the DCS such that the resulting network structure comprises a homogeneous SONET ring network. As previously described, such decoupling is achieved by the creation of a virtual digital link between DCS equipment and ADM equipment within a DCS. In this manner, the plurality of ADMs forming the homogeneous SONET network may be managed by an ADM element management system, while the DCS associated with the homogeneous SONET network may be managed by a DCS element management system. As previously noted, such bifurcation of element management functions allows for the homogeneous SONET ring network to be managed as a ring, rather than one or more arcs. The method 400 then proceeds to step 430.

At step 430, the DCS element management system is used to manage each of the DCS network elements within the network. The method 400 then proceeds to step 435.

At step 435, the SONET element management system is used to manage each of the ADM network elements within the network. The method 400 then proceeds to step 440.

At step 440, a query is made as to whether hybrid DCS/SONET structures such as hybrid ring networks still exist within the network. If the query at step 440 is answered negatively, then the method proceeds to step 450 where it is exited. If the query at step 440 is answered affirmatively, then the method 400 proceeds to step 445.

At step 445 an ADM is inserted between the DCS and SONET network elements to physically decouple the DCS and SONET network elements such that hybrid DCS/SONET structures are converted into respective homogeneous DCS/SONET structures linked by the inserted ADM. That is, in the case of a hybrid ring network including a DCS associated with one of a plurality of ADMs forming a SONET ring network, an additional ADM is inserted between the DCS and the one ADM. In this manner, the SONET ring network may be managed as a ring rather than as one or more arcs. The above-described steps 405–440 are then repeated.

The above-described method 400 of FIG. 4 provides for both logical decomposition of hybrid DCS/SONET ring networks and physical decomposition of hybrid DCS/SONET ring networks. For example, DCS network elements incorporating ADMs are used to help reduce the costs of hardware. Thus, in the case of a DCS incorporating one or more ADMs, the logical separation of the ADMs from the DCS network elements may be the only option for realizing a homogeneous SONET ring network coupled to the DCS in a hybrid ring network management. In such a case, the insertion of additional ADMs between the DCS incorporating an ADM and the ring network coupled to that ADM may be the only option for realizing a homogeneous SONET ring network coupled to the DCS.

In one embodiment of the invention, a SONET element management system (EMS) is adapted to manage, as a network ring structure, a SONET ring formed using at least one add-drop multiplexer (ADM) included within a hybrid digital cross-connect system (DCS). In this embodiment of the invention, the SONET EMS 125 is adapted to recognize that an ADM (such as ADM 1421) included within a DCS system (such as DCS 140) may be managed in a manner distinct from the management of the other elements within the DCS system (such as other DCS equipment). Thus, the adapted SONET EMS preserves the ring structure for management purposes, regardless of whether or not one or more ADMs used within the ring structure are physically included within a hybrid DCS.

The above-described invention has been primarily described in the context of a hybrid DCS/SONET environment. However, it will be appreciated by those skilled in the art that the invention is also applicable to other hybrid network elements such as SONET/ATM (asynchronous transfer mode) in addition to DCS/SONET hybrid network elements.

Although various embodiments which incorporate the teachings of the present invention have been shown and described in detail herein, those skilled in the art can readily devise many other varied embodiments that still incorporate these teachings, such as hybrid SONET/ATM embodiment and other processes and apparatus for practicing those processes.

What is claimed is:

1. In a communications system utilizing a digital cross-connect system (DCS) element management system (EMS) for managing DCS network elements and a SONET EMS for managing SONET add/drop multiplexer (ADM) network elements, apparatus comprising:

a non-homogeneous SONET ring network including a plurality of ADMs;

a plurality of DCS elements, each of said plurality of DCS elements being managed by said DOCS EMS, at least one of said plurality of DCS elements including an ADM of said plurality of ADMs that is logically coupled to said non-homogeneous SONET ring network, said ADM being virtually coupled to said at least one DCS by a digital link, such that said non-homogeneous SONET ring network including said plurality of ADMs is managed by said SONET EMS, so that the respective DCS and SONET EMSs manage the hybrid ring structure in a manner that avoids logically decomposing the SONET network elements of the non-homogeneous SONET ring network into one or more SONET arcs.

2. The apparatus of claim 1, wherein said DOS EMS and said SONET EMS are coupled to respective DCS and SONET network elements by a data communication network (DCN).

3. The apparatus of claim 1, wherein said virtual digital link comprises one of an STS-1 and STS-3 digital link.

4. Apparatus comprising:
a hybrid digital cross-connect system (DCS), said hybrid DCS comprising at least one add-drop multiplexer (ADM) communicating with a DCS port via a virtual digital link;
a SONET ring network comprising a plurality of ADMs including said at least one ADM within said hybrid DCS, wherein said virtual digital link decouples said at least one ADM from DCS elements of said hybrid DCS;
said SONET ring network, including said at least one ADM of said hybrid DCS, being managed as a ring by a SONET element management system (EMS);
said DCS being managed by a DCS EMS, so that the respective DCS and SONET EMSs manage the hybrid ring structure in a manner that avoids logically decomposing the SONET network elements of the non-homogeneous SONET ring network into one or more SONET arcs.

5. The apparatus of claim 4, wherein said virtual digital link comprises one of an STS-1 and STS-3 digital link.

6. A hybrid digital cross-connect system (DCS)/SONET Integrated SONET ring structure, comprising:
a plurality of add-drop multiplexers (ADMs) arranged according to a ring topology and managed as a ring by a SONET element management system (EMS), wherein at least one of said ADMs forming said SONET ring is included within an input/output module of a hybrid DCS, said input/output module further comprising a DCS port operatively coupled to said ADM via a virtual digital link, so that the respective DCS and SONET EMSs manage the hybrid ring structure in a manner that avoids logically decomposing the ADMs in the ring topology into one or more SONET arcs.

7. The apparatus of claim 6, wherein said virtual digital link comprises one of an STS-1 and STS-3 digital link.

8. Apparatus, comprising:
a SONET element management system (EMS), said SONET EMS being adapted to manage, as a network ring structure, a SONET ring formed using at least one add-drop multiplexer (ADM) included within a hybrid digital cross-connect system (DCS), so that the SONET EMS manages the ring structure in a manner that avoids logically decomposing the SONET network elements of the ring structure into one or more SONET arcs.

9. The apparatus of claim 8, wherein said ADM included within said hybrid DCS is decoupled from DCS equipment within said hybrid DCS by a virtual digital link.

10. The apparatus of claim 9, wherein said virtual digital link comprises one of an STS-1 and STS-3 digital link.

11. In a communications system comprising a digital cross-connect system (DCS) including a SONET add/drop multiplexer (ADM), a method of utilizing said ADM as a network element within a non-homogeneous SONET ring such that said non-homogeneous SONET ring may be managed as a homogeneous SONET ring structure by a SONET element management system, said method comprising the steps of:
characterizing said DCS including said ADM as comprising a logical DCS network element and a logical ADM network element, said logical DCS network element communicating with said logical ADM network element via a virtual digital link;
utilizing said logical ADM network element within said SONET ring non-homogeneous as a network element being managed as part of said homogeneous SONET ring structure by said SONET element management system in a manner that avoids logically decomposing the SONET network elements of the structure into one or more SONET arcs.

12. The method of claim 11, wherein said virtual digital link comprises one of an STS-1 and STS-3 digital link.

13. A method for adapting a communications network comprising the steps of:
identifying each network element within a network to be managed;
determining if hybrid DCS/SONET network structures are present in the network, each said hybrid DCS/SONET network structures comprising DCS element having an add-drop multiplexer (ADM) that is logically coupled to a SONET network;
decoupling, from said determined DCS/SONET network structures, those ADMs used to form hybrid ring networks;
managing said hybrid ring networks as network ring structures using a SONET element management system (EMS),
so that the SONET EMS manages the hybrid ring networks in a manner that avoids logically decomposing the SONET network elements of the hybrid ring networks into one or more SONET arcs.

14. The method of claim 13, further comprising the step of:
inserting an additional ADM between a hybrid DCS/SONET structure and a hybrid ring utilizing an ADM network element within said hybrid DCS/SONET structure.

15. The method of claim 13, wherein said DCS network elements and ADM network elements are decoupled via a virtual digital link.

16. The method of claim 15 wherein said virtual digital link comprises one of an STS-1 and STS-3 digital link.

17. A method for adapting a communications network comprising the steps of:
identifying each network element within a network to be managed;
identifying homogeneous network structures within the network to be managed;
identifying non-homogeneous network structures within the network to be managed;
determining if hybrid DCS/SONET network structures are present in the network to be managed, each said hybrid DCS/SONET network structures comprising a DCS element and having an add-drop multiplexer (ADM) that is logically coupled to a SONET network;

decoupling, from said determined DCS/SONET network structures, those ADMs used to form hybrid ring networks;

managing, using a DCS element manager, DCS network elements within said network to be managed;

managing, using a SONET element manager, ADMs within said network to be managed, wherein ADMs forming ring structures being managed as homogeneous network ring structures;

so that the respective DCS and SONET element managers manage the hybrid ring networks in a manner that avoids logically decomposing the ADMs of the hybrid ring networks into one or more SONET arcs.

* * * * *